United States Patent [19]

Masuda et al.

[11] Patent Number: 4,579,937

[45] Date of Patent: * Apr. 1, 1986

[54] CATALYTIC PROCESS FOR PRODUCING CROSS-LINKED POLYESTERAMIDE FROM BIS-OXAZOLINE AND DICARBOXYLIC ACID

[75] Inventors: Isao Masuda, Shimizu; Kazuhiro Arita, Takatsuki; Yasuo Sano, Minoo, all of Japan

[73] Assignee: Takeda Chemical Industries, Ltd., Osaka, Japan

[*] Notice: The portion of the term of this patent subsequent to Oct. 2, 2001 has been disclaimed.

[21] Appl. No.: 660,487

[22] Filed: Oct. 11, 1984

[30] Foreign Application Priority Data

Oct. 21, 1983 [JP] Japan .................................. 58-198120

[51] Int. Cl.$^4$ ............................................. C08G 69/44
[52] U.S. Cl. .................................................... 528/363
[58] Field of Search ......................................... 528/363

[56] References Cited

U.S. PATENT DOCUMENTS 4,474,942 10/1984 Sano et al. .......................... 528/363

Primary Examiner—Harold D. Anderson
Attorney, Agent, or Firm—Wenderoth, Lind & Ponack

[57] ABSTRACT

A process for producing a cross-linked polyesteramide which comprises: reacting a bis(2-oxazoline) compound with a dicarboxylic acid in a molar ratio of the dicarboxylic acid to the bis(2-oxazoline) compound of not more than about 1, at an elevated temperature in the presence of a catalyst selected from the group consisting of a strong acid, a sulfonic acid ester, a sulfuric acid ester and an organic halide which contains at least one halomethyl group in the molecule.

The cross-linked polyesteramide may be usable for the production of machinery parts such as rolls and gears and embedded moldings of electrical machinery and apparatus parts as well as for electric insulating materials and dental uses. The cross-linked polyesteramide may further find applications in, for example, adhesives and various coating compositions.

13 Claims, No Drawings

CATALYTIC PROCESS FOR PRODUCING CROSS-LINKED POLYESTERAMIDE FROM BIS-OXAZOLINE AND DICARBOXYLIC ACID

This invention relates to a process for producing cross-linked polyesteramides.

It is already known, as disclosed in U.S. Pat. No. 3,476,712, that the reaction of a bis(2-oxazoline) compound with a dicarboxylic acid in an equimolar amount under heating produces linear polyesteramides.

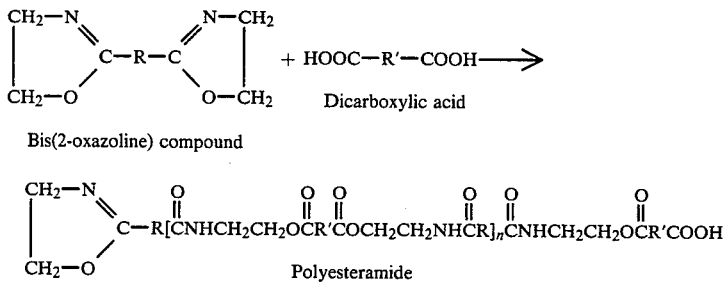

The present inventors have made an intensive investigation on the above polyaddition reaction, and have found that the reaction in the presence of oxazoline ring-opening polymerization catalysts at an elevated temperature causes the ring-opening polymerization between the terminal oxazolin rings concurrently with the formation of the polyesteramides, and as a result the reaction provides novel three-dimensionally cross-linked polyesteramides suitable for use in various resin products. The polyesteramide may have structures, for example, as below.

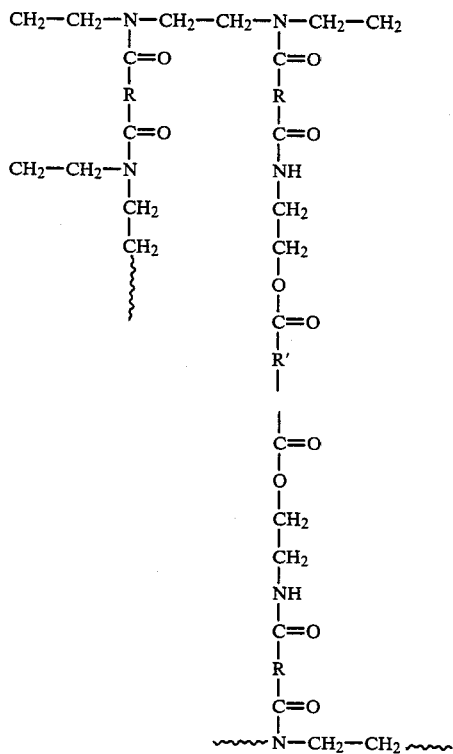

It is therefore an object of the invention to provide a process for producing cross-linked polyesteramides.

The process for producing cross-linked polyesteramides of the invention comprises: reacting a bis(2-oxazoline) compound with a dicarboxylic acid in a molar ratio of the dicarboxylic acid to the bis(2-oxazoline) compound of not more than about 1, at an elevated temperature in the presence of an oxazoline ring-opening polymerization catalyst.

The bis(2-oxazoline) compound used in the present invention has the general formula:

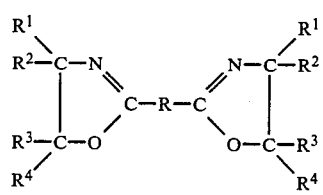

wherein R represents a C—C covalent bond or a divalent hydrocarbon group, preferably an alkylene, a cycloalkylene or an arylene, e.g., phenylene, and $R^1$, $R^2$, $R^3$ and $R^4$ independently represent hydrogen, an alkyl or an aryl. In the case where R is a C—C covalent bond, the bis(2-oxazoline) compound may be 2,2'-bis(2-oxazoline), 2,2'-bis(4-methyl-2-oxazoline) or 2,2'-bis(5-methyl-2-oxazoline). Examples of the bis(2-oxazoline) compound wherein R is a hydrocarbon group are 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)cyclohexane, 1,2-bis(2-oxazolinyl-2)benzene, 1,3-bis(2-oxazolinyl-2)benzene, 1,4-bis(2-oxazolinyl-2)benzene, 1,2-bis(5-methyl-2-oxazolinyl-2)benzene, 1,3-bis(5-methyl-2-oxazolinyl-2)benzene, 1,4-bis(5-methyl-2-oxazolinyl-2)-benzene and 1,4-bis(4,4'-dimethyl-2-oxazolinyl-2)benzene. These may be used as a mixture of two or more.

The dicarboxylic acid usable in the invention has the general formula:

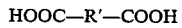

HOOC—R'—COOH wherein R' is a divalent hydrocarbon group, and is fusible at the reaction temperature, and includes aliphatic dicarboxylic acids such as malonic acid, succinic acid, glutaric acid, adipic acid, pimelic acid, suberic acid, azelaic acid, sebacic acid, dodecandioic acid, dimer acid, eicosandioic acid or thiodipropionic acid, and aromatic dicarboxylic acids such as phthalic acid, isophthalic acid, terephthalic acid, naphthalenedicarboxylic acid, diphenylsulfonedicarboxylic acid or diphenylmethanedicarboxylic acid. These may also be used as a mixture of two or more.

According to the invention, the bis(2-oxazoline) compound and the dicarboxylic acid is reacted at an elevated temperature in a molar ratio of the dicarboxylic acid to the bis(2-oxazoline) compound of not more than about 1, preferably in the range of about 1 to about 0.2, in the presence of an oxazolin ring-opening polymerization catalyst to provide the cross-linked polyesteramide.

The oxazoline ring-opening polymerization catalyst is already known, as described in, for example, Poymer J., Vol. 3, No. 1, pp. 35-39 (1972) and Polymerization Reaction Treatize Course 7, Ring-Opening Polymerization II, pp. 165-189, Kagaku Dojin (1973). The oxazoline ring-opening polymerization catalyst used in the invention includes a strong acid, a sulfonic acid ester, a sulfuric acid ester and an organic halide which contains at least one halomethyl group in the molecule.

More specifically, the strong acid includes an oxoacid such as phosphorous acid, sulfuric acid or nitric acid, a hydroacid such as hydrochloric acid or hydrogen sulfide, and an organic strong acid such as phenyl phosphorous acid, methanesulfonic acid, benzenesulfonic acid, p-toluenesulfonic acid, dodecylbenzenesulfonic acid, naphthalene-α-sulfonic acid, naphthalene-β-sulfonic acid, sulfanilic acid or phenylphosphonic acid.

The sulfonic acid ester includes methyl p-toluenesulfonate and ethyl p-toluenesulfonate. The sulfuric acid ester includes dimethylsulfuric acid and diethylsulfuric acid.

Preferred examples of the organic halide as defined above are a monohaloalkane and a polyhaloalkane such as methyl iodide, butyl chloride, butyl bromide, butyl iodide, lauryl bromide, allyl bromide or ethane tetrabromide. Other examples of the organic halide are mono- or polyhalomethylbenzenes, e.g., benzyl bromide and p,p'-dichloromethylbenzene. The organic halide as the catalyst further includes a haloalkane which has a hydroxyl and/or a carboxyl group in the molecule, such as α-bromopropionic acid, 2,3-dibromopropanol or α-bromobutyric acid.

Among the above catalysts, the strong acid, sulfuric acid ester and sulfonic acid ester are preferred, and among these the sulfonic acid ester is most preferred.

The catalyst is used in amounts of 0.1-5% by weight, preferably 0.3-3% by weight based on the weight of a mixture of the bis(2-oxazoline) compound and the dicarboxylic acid.

In the invention, the bis(2-oxazoline) compound and the dicarboxylic acid may be first mixed and then heated to melt together, or each of them may be first heated to melt and then mixed together, and when necessary, followed by further heating. The catalyst may also be added at any stage. For instance, the catalyst may be added to either of the bis(2-oxazolin) compound or the dicarboxylic acid, or the catalyst may be added to a mixture of these before, during or after heating to melt.

The reaction temperature at which the cross-linking reaction proceeds depends on the individual bis(2-oxazoline) compound, the dicarboxylic acid and catalyst used, and hence it is not specifically limited, however, usually it is not lower than about 100° C., preferably in the range of about 130° C. to 230° C. The reaction time or gellation time also varies depending on the catalyst used as well as the individual bis(2-oxazoline) compound and dicarboxylic acid used, but usually in the range of about 10 seconds to 3 hours.

According to the present invention, cross-linked polyesteramides including reinforcements and/or fillers is also obtainable, for example, by mixing the reinforcement and/or filler with a mixture of the bis(2-oxazoline) compound and the dicarboxylic acid and then by adding the catalyst to the resultant mixture to cause the reaction.

As the reinforcement, fibrous one which is in use in the ordinary plastic industry is usable. Specific examples of such reinforcement are inorganic fibers such as glass fibers, carbon fibers, quartz fibers, ceramic fibers, zirconia fibers, boron fibers, tungsten fibers, molybdenum fibers, steel fibers, berylium fibers or asbestos fibers, natural fibers as cotton, flax, hemp, jute or sisal hemp, and synthetic fibers having heat-resistance at the reaction temperature such as polyamide fibers or polyester fibers. In order to improve adhesion to the cross-linked resin, the fibrous reinforcement may be treated in advance with, for example, chromium compounds, silane, vinyltriethoxysilane or aminosilane.

The amount of the reinforcement may be selected, for example, upon the viscosity of the molten mixture, the reinforcement used, the requirements for cured products, etc., however, it is usually in the range of about 3-95% by weight, preferably about 5-80% by weight based on the mixture of the bis(2-oxazoline) compound and the dicarboxylic acid.

Various fillers may also be incorporated into the cross-linked polyesteramides. Preferred examples of the filler include oxides such as silica, alumina or titanium dioxide, hydroxides such as aluminum hydroxide, carbonates such as calcium carbonate or magnesium carbonate, silicates such as talc, clay, glass beads or bentonite, carbon materials such as carbon black, metal powders such as iron powder or aluminum powder. The amount of the filler may be selected as in the case of the reinforcement, and it is usually in the range of about 3-500% by weight, preferably about 5-200% by weight based on the mixture.

The cross-linked polyesteramide produced according to the present invention has excellent physical properties inclusive of mechanical strength, abrasion strength, heat-resistance and electrical properties as well as excellent chemical properties. Furthermorte, according to the invention, cross-linked polyesteramides provided with a wide range of physical and chemical properties are obtainable by selecting the bis(2-oxazoline) compound and the dicarboxylic acid and the molar ratio therebetween.

In particular, the present process permits a rapid curing of the two reactive components, i.e., the bis(2-oxazoline) compound and the dicarboxylic acid, so that the reaction system is suitably applicable to the reactive injection molding (RIM).

Therefore, the cross-linked polyesteramides may be usable for the production of machinery parts such as rolls and gears and embedded moldings of electrical machinery and apparatus parts as well as for electric insulating materials and dental uses. The cross-linked polyesteramide of the invention may further find applications in, for example, adhesives and various coating compositions.

Furthermore, the cross-linked polyesteramide which includes therein reinforcements and/or fillers provides resin molds with superior mechanical properties, especially outstanding toughness, and heat-resistance to conventional thermosetting resins. Therefore, cured products according to the invention finds applications not only in the application fields for conventional fiber-reinforced or filler-containing plastics, such as applications of aircraft, craft, railway vehicles, automobiles, civil engineering, construction and building, electrical and electronic appliances, anti-corrosion equipment, sporting and leisure goods, medical and industrial parts, but also in the new applications where conventional fiber-reinforced and filler-containing plastics have failed to achieve application development.

The present invention will be more easily understood with reference to the following examples, which however are intended to illustrate the invention only and are not to be construed as limiting the scope of the invention. In the examples, the thermal deflection temperature was measured under a load of 18.6 kg applied to a sample resin sheet, and the water absorption was measured by the increase in weight of a sample in the form of disc after immersing in water at 23° C. for 24 hours.

EXAMPLE 1

A mixture of 32.4 g (0.15 mole) of 1,3-bis(2-oxazolinyl-2)benzene, 14.6 g (0.10 mole) of adipic acid and 0.4 g of a catalyst as shown below were placed in a test tube and heated with stirring in an oil bath of 180° C. The gelation times by the second required for the resultant molten mixture to gel after the mixture has reached 150° C. were as follows:

Nitric acid—45
Phosphorous acid—45
Benzenesulfonic acid—30
Sulfanilic acid—90
p-Toluenesulfonic acid—30
Methyl p-toluenesulfonate—20
Dimethylsulfuric acid—15
p,p'-Dichloromethylbenzene—75

EXAMPLE 2

A mixture of 65 g (0.30 mole) of 1,3-bis(2-oxazolinyl-2)benzene and 22 g (0.15 mole) of adipic acid was heated to 120° C. to melt, and a catalyst as set forth in Table was added to the mixture with stirring. Then the mixture was poured into a mold which had a cavity of 0.3 cm×19 cm×12 cm and had been in advance heated to 200° C., and then was left standing in an oven at 200° C. for 30 minutes to allow the mixture to form a cross-linked polyesteramide. After cooling, the cured sheet 3 mm in thickness was taken out of the mold, and was subjected to measurements of the properties, which are shown in Table.

EXAMPLE 3

A mixture of 97 g (0.45 mole) of 1,3-bis(2-oxazolinyl-2)benzene and 44 g (0.30 mole) of adipic acid was heated to 120° C. to melt. While the mixture was kept at the temperature, 140 g of alumina and then 1.4 g of methyl p-toluenesulfonate were added thereto with an effective stirring. The mixture was then poured into the same mold as used in Example 2 which had been heated in advance to 200° C. and then was left standing for 1 hour to allow the mixture to form a cross-linked polyesteramide which contained the filler. After cooling, the cured sheet was taken out of the mold, and was subjected to measurements of the properties, which are shown below.

Hardness by a Barcol impressor—59
Specific density—1.92
Flexural strength—12 kgf/mm$^2$
Flexural modulas—790 kgf/mm$^2$
Thermal deflection temperature—99° C.
Abrasion resistance by a Taber tester CS-17 under a load of 1 kg at 1000 rpm.—0.9×10$^{-2}$ cm$^3$
Water absorption—0.58%

EXAMPLE 4

A mixture of 110 g (0.51 mole) of 1,3-bis(2-oxazolinyl-2)benzene and 44 g (0.30 mole) of adipic acid was heated to 120° C. to melt, and 1.5 g of α-bromopropionic acid was added thereto under an effective stirring. The mixture was then cured in the same manner as in Example 2 at 200° C. for 1 hour.

TABLE

| | Catalysts (wt. %) | Flexural Strength (kgf/mm$^2$) | Flexural Modulus (kgf/mm$^2$) | Thermal Deflection Temperature (°C.) | Water Absorption (%) |
|---|---|---|---|---|---|
| p-Toluenesulfonic acid | 1.0 | 22 | 450 | 127 | 1.0 |
| Benzenesulfonic acid | 1.0 | 22 | 440 | 121 | 1.2 |
| Methyl p-toluenesulfonate | 0.6 | 22 | 450 | 133 | 0.9 |
| Phenylphosphonic acid | 0.6 | 21 | 450 | 123 | 1.0 |
| Ethyl p-toluenesulfonate | 0.6 | 21 | 470 | 132 | 1.0 |

The cast sheet had the following properties.
Thermal deflection temperature: 100° C.
Water absorption: 1.5%
Flexural strength: 22 kgf/mm$^2$
Flexural modulas: 490 kgf/mm$^2$

EXAMPLE 5

A mixture of 71 g (0.33 mole) of 1,3-bis(2-oxazolinyl-2)benzene and 22 g (0.15 mole) of adipic acid was heated to 120° C. to melt, and 1.8 g of methyl p-toluenesulfonate was added thereto with an effective stirring. The mixture was then poured into the same mold as used in Example 2 which had been heated in advance to 200° C. and was cured at 200° C. for 1 minute. After cooling, the cured sheet was found to have a thermal deflection temperature 138° C.

EXAMPLE 6

A mixture of 65 g (0.30 mole) of 1,3-bis(2-oxazolinyl-2)benzene, 22 g (0.15 mole) of adipic acid was heated to 120° C. to melt, and 0.4 g of methyl p-toluenesulfonate was then added thereto with an effective stirring. The mixture was then poured into the same mold as used in Example 2 which had been heated in advance to 140° C. and was cured at 140° C. for 3 hours.

After cooling, the cured sheet was found to have the properties as follows.
Thermal deflection temperature: 132° C.
Flexural strength: 22 kgf/mm$^2$
Flexural modulas: 440 kgf/mm$^2$

EXAMPLE 7

A mixture of 31.5 g (0.15 mole) of 1,3-bis(2-oxazolinyl-2)benzene and 12.1 g of terephthalic acid was weighed into a beaker followed by heating the mixture to melt and maintaining it at 140° C. to prepare a solution A. A mixture of 1.7 g (0.008 mole) of 1,3-bis(2-oxazolinyl-2)benzene and 9.8 g (0.04 mole) of dodecanedioic acid was weighed into a beaker followed by heating the mixture to melt and maintaining it at 140° C. to prepare a solution B. The thus prepared solutions A and B were mixed together with methyl p-toluenesulfonate on an oil bath of 140° C. The resultant mixture was found to gel after 185 seconds.

What is claimed is:

1. A process for producing a cross-linked polyesteramide which comprises: reacting a bis(2-oxazoline) compound with a dicarboxylic acid in a molar ratio of the dicarboxylic acid to the bis(2-oxazoline) compound of not more than about 1, at an elevated temperature in the presence of an oxazoline ring-opening polymerization catalyst.

2. A process for producing a cross-linked polyesteramide as claimed in claim 1, wherein the oxazoline ring-opening polymerization catalyst is a strong acid selected from the group consisting of an oxoacid, a hydroacid and an organic strong acid.

3. A process for producing a cross-linked polyesteramide as claimed in claim 1, wherein the oxazoline ring-opening polymerization catalyst is a sulfonic acid ester.

4. A process for producing a cross-linked polyesteramide as claimed in claim 1, wherein the oxazoline ring-opening polymerization catalyst is a sulfuric acid ester.

5. A process for producing a cross-linked polyesteramide as claimed in claim 1, wherein the oxazoline ring-opening polymerization catalyst is an organic halide which contains at least one halomethyl group in the molecule.

6. A process for producing a cross-linked polyesteramide as claimed in claim 2, wherein the organic strong acid is an alkanesulfonic acid or an arenesulfonic acid.

7. A process for producing a cross-linked polyesteramide as claimed in claim 3, wherein the sulfonic acid ester is an alkyl p-toluenesulfonate.

8. A process for producing a cross-linked polyesteramide as claimed in claim 4, wherein the sulfuric acid ester is a dialkylsulfuric acid.

9. A process for producing a cross-linked polyesteramide as claimed in claim 5, wherein the organic halide is a monohaloalkane or a polyhaloalkane.

10. A process for producing a cross-linked polyesteramide as claimed in claim 5, wherein the organic halide is an $\alpha$-haloalkanoic acid.

11. A process for producing a cross-linked polyesteramide as claimed in claim 1, wherein the catalyst is used in amounts of 0.1–5% by weight based on the weight of a mixture of the bis(2-oxazoline) compound and the dicarboxylic acid.

12. A process for producing a cross-linked polyesteramide as claimed in claim 1, wherein the bis(2-oxazoline) compound is reacted with the dicarboxylic acid in the presence of about 3–95% by weight of reinforcements based on the mixture of the bis(2-oxazoline) compound and the dicarboxylic acid.

13. A process for producing a cross-linked polyesteramide as claimed in claim 1, wherein the bis(2-oxazoline) compound is reacted with the dicarboxylic acid in the presence of about 3–500% by weight of fillers based on the mixture of the bis(2-oxazoline) compound and the dicarboxylic acid.

* * * * *